United States Patent Office 3,278,460
Patented Oct. 11, 1966

3,278,460
CURABLE ALIPHATIC POLYGLYCIDYL ETHER POLYAMINE COMPOSITIONS
Victor Auerbach, North Plainfield, and Arthur K. Ingberman, Bridgewater Township, N.J., assignors to Union Carbide Corporation, a corporation of New York
No Drawing. Filed Jan. 31, 1964, Ser. No. 343,443
The portion of the term of the patent subsequent to Aug. 25, 1976, has been disclaimed
2 Claims. (Cl. 260—2)

This application is a continuation-in-part of our copending application Serial No. 833,695, filed August 14, 1959, now abandoned, which in turn is a continuation-in-part of our application Serial No. 506,386, filed May 5, 1955, now U.S. Patent 2,901,461.

This invention relates to curable aliphatic polyglycidyl ether-polyamine compositions. More particularly, this invention relates to curable compositions of aliphatic polyglycidyl ethers and hydroxyalkyl alkylene polyamines.

Hydroxyalkyl alkylene polyamines have been found to be particularly desirable for use in curing polyglycidyl ethers of polyhydric phenols in that (1) under normal conditions of use they are not skin irritants; (2) they are water-soluble liquids of high fluidity, easy to handle and to dispense and hence easily and safely removable from equipment and one's person; (3) they are sufficiently nonvolatile to be used directly, i.e., without prior adduct formation, and without giving rise to bubbles or froth during cure of polyglycidyl ethers of polyhydric phenols; (4) they are clear, light colored from colorless to amber, and polyglycidyl ethers of polyhydric phenols cured with these polyamines have substantially the same color as the uncured product; (5) generally, they are less prone to scavenge carbon dioxide from the atmosphere than the non-hydroxyalkylated alkylene polyamines, hence there is little, if any, bubble formation in the polyglycidyl ether of the polyhydric phenol due to the presence of carbon dioxide therein as it is being cured by the hydroxyalkyl alkylene polyamine; and (6) polyglycidyl ethers of polyhydric phenols in admixture with a hydroxyalkyl alkylene polyamine have relatively long "pot" lives which make these compositions particularly desirable for use in molding applications as they adequately fill the mold cavity before curing to an infusible, insoluble state.

The relatively long "pot" life of a composition comprising a polyglycidyl ether of a polyhydric phenol and a hydroxyalkyl alkylene polyamine which has made such compositions particularly desirable for use in molding applications has limited to an extent the use of such compositions in spray coating applications, for example, the simultaneous spraying of the composition and a filler into a mold to produce shaped articles such as boats and the like, or the simultaneous spraying of the composition and filler, such as sand, onto a surface to provide a non-skid coating. For obvious reasons, for the successful operation of these and other comparable coating applications, it is necessary that the compositions cure to an infusible, insoluble state within a few minutes after application.

The present invention provides for compositions which have an exceedingly fast cure speed and an unusually high peak exotherm which makes these compositions particularly advantageous for use in coating applications, especially in spray coating applications of the type previously described and also for use in forming thin sections such as insulating wafers which can be used in electrical switches and the like. In addition, the compositions of the present invention, once cured, have improved light stability, i.e., resistance to discoloration on exposure to ultraviolet light and greater toughness and flexibility than compositions based on polyglycidyl ethers of polyhydric phenols.

By the term "aliphatic polyglycidyl ether" as used herein is meant, among others, a compound having the general formula:

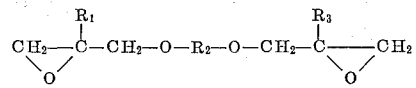

wherein $R_1$ and $R_3$ are hydrogen and/or alkyl having a maximum of four carbon atoms and $R_2$ is a saturated hydrocarbon radical, for example, alkylene or alkylidene, generally having a maximum of four carbon atoms, or a saturated hydrocarbon radical, generally having a maximum of four carbon atoms, wherein one of its hydrogen atoms is replaced by a glycidyl ether group, i.e.,

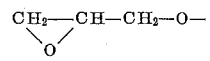

Particularly desirable aliphatic polyglycidyl ethers are those compounds whose structure can be represented by the formula noted above wherein $R_1$ and $R_3$ are hydrogen or methyl and $R_2$ is a saturated hydrocarbon radical having a maximum of two carbon atoms.

Illustrative of compounds having the general formula noted above are the following:

Diglycidyl acetal

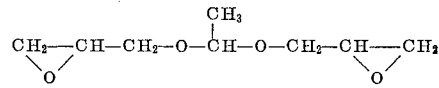

and polyglycidyl ethers of polyhydric aliphatic compounds, as for example, 1,2-bis-(2,3-epoxy-2-methylpropoxy)ethane

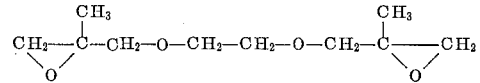

1,2-bis-(2,3-epoxypropoxy)ethane

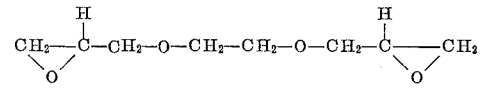

1,2,3-tris-(2,3-epoxypropoxy)propane

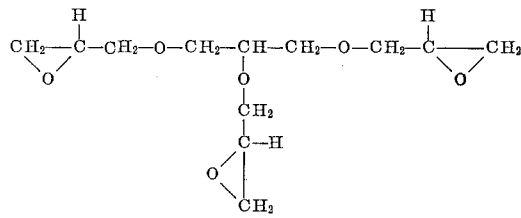

Polyglycidyl ethers of polyhydric aliphatic compounds can be conveniently produced by the procedure described in British Patent 672,935, incorporated herein by reference, or by reacting a glycol with a stoichiometric excess of epichlorohydrin in the presence of a catalytic amount of boron trifluoride. Other polyglycidyl ethers of polyhydric aliphatic compounds are enumerated in U.S. Patent 2,633,458 to Shokal, the disclosure of which is incorporated herein by reference.

Hydroxyalkyl alkylene polyamines suitable for purposes of this invention are those having at least one hydroxyalkyl group and at least three amino hydrogen atoms per molecule.

Illustrative of such hydroxyalkyl alkylene polyamines are those whose compositions can be represented by the formula:

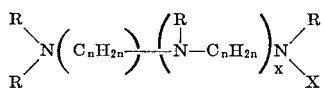

wherein X is an integer from zero to three, $n$ is an integer from 2 to 6, R in each instance is a monovalent substituent being either hydrogen or a hydroxyalkyl group, as for example, hydroxyethyl and hydroxypropyl, the hydroxyalkyl groups in any molecule not necessarily being all the same, and the number of instances per molecule where R represents a hydroxyalkyl group being at least one, but less than $X+2$.

Typical hydroxyalkyl alkylene polyamines useful in the practice of the present invention, and within the scope of the above structural formula are the following:

N-hydroxyethyl ethylene diamine $$NH_2CH_2CH_2NHCH_2CH_2OH$$

N-hydroxyethyl pentamethylene diamine $$NH_2(CH_2)_5NHCH_2CH_2OH$$

N-hydroxypropyl tetramethylene diamine $$NH_2(CH_2)_4NHC_3H_6OH$$

N-hydroxyethyl diethylene triamine $$NH_2C_2H_4NHC_2H_4NHC_2H_4OH$$

N,N-bis(hydroxyethyl)diethylene triamine $$NH_2C_2H_4NHC_2H_4N(C_2H_4OH)_2$$

N,N''-bis(hydroxyethyl)diethylene triamine $$NH(C_2H_4NHC_2H_4OH)_2$$

N-hydroxypropyl diethylene triamine $$NH_2C_2H_4NHC_2H_4NHC_3H_6OH$$

N,N-bis(hydroxypropyl)diethylene triamine $$NH_2C_2H_4NHC_2H_4N(C_3H_6OH)_2$$

N,N''-bis(hydroxypropyl)diethylene triamine $$NH(C_2H_4NHC_3H_6OH)_2$$

N-hydroxyethyl propylene diamine $$NH_2CH_2CH_2CH_2NHCH_2CH_2OH$$

N-hydroxyoctyl diethylene triamine $$NH_2C_2H_4NHC_2H_4NHC_8H_{16}OH$$

N-hydroxypropyl propylene diamine $$NH_2C_3H_6NHC_3H_6OH$$

N-hydroxyethyl dipropylene triamine $$NH_2C_3H_6NHC_3H_6NHC_2H_4OH$$

N,N-bis(hydroxyethyl)dipropylene triamine $$NH_2C_3H_6NHC_3H_6N(C_2H_4OH)_2$$

N,N'-bis(hydroxyethyl)dipropylene triamine

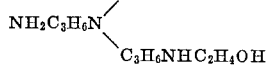

Tris-(hydroxyethyl)triethylene tetramine $$(HOC_2H_4)_2N(C_2H_4NH)_3C_2H_4OH$$

The hydroxyalkyl alkylene polyamines can be conveniently prepared by reacting an alkylene oxide with an alkylene polyamine as illustrated below with respect to ethylene oxide and diethylene triamine.

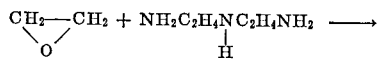

$$NH_2C_2H_4NHC_2H_4NHC_2H_4OH$$

The reaction can be conducted under pressure if desired and either in the absence of solvents or in the presence of water or an aliphatic monohydric alcohol at temperatures of from 0° C. to boiling. It has been found that the reaction is more advantageously conducted at temperatures below about 40° C., and preferably from about 0° C. to 35° C., as at such temperatures improved yields of more readily purified products are obtained.

Sufficient amounts of hydroxyalkyl alkylene polyamines are used to harden the epoxy to an infusible state. Generally, the hydroxyalkyl alkylene polyamines are admixed with the aliphatic polyglycidyl ethers in stoichiometric amounts. For purposes of stoichiometric calculations, one epoxy group is deemed to react with one amino hydrogen.

Actual amounts of hydroxyalkyl alkylene polyamine used generally vary from about 60 percent of stoichiometric to about 40 percent in excess of stoichiometric.

In those instances wherein it is desired to formulate a composition and to store the composition for future use, the temperature of the composition is generally brought to and maintained at about 0° C. In this manner the pot life of the composition is at least 2 days.

*Example 1*

A composition was prepared by admixing 64.6 parts by weight of diglycidyl acetal and 35.4 parts by weight of N-hydroxyethyl diethylene triamine at room temperature, about 23° C. The amine and epoxy compounds were present in stoichiometric amounts. The "pot" life of the mixture was determined according to the following procedure:

50 parts by weight (grams) of the mixture were placed in a four ounce paper cup; cup and contents were placed in a constant temperature box at 25° C. An iron-constantan thermocouple was then positioned exactly in the center of the curing mass. The time elapsed between the initial addition of the hardener to the epoxy and attainment of an immobile, substantially hard state was recorded as pot life. The maximum temperature registered by the thermocouple on a recording potentiometer was noted as the peak exotherm.

The pot life of the composition was seven minutes and its peak exotherm was greater than 300° C.

Bar castings of the composition, 8" x 1⅛" x ¼", were prepared using the following cure cycle: allowed to stand overnight at room temperature, then cured at 120° C. for two hours. The bar castings were flexible at room temperature and extremely tough.

In order to indicate the extremely fast cure time of the compositions of this invention, a polyglycidyl ether of 2,2-bis(p-hydroxyphenyl)propane having the properties noted below was used in lieu of diglycidyl acetal. Properties of the polyglycidyl ether of 2,2-bis(p-hydroxyphenyl)propane were: specific gravity, 1.16 (at 25° C.); viscosity, 15,000 cps. (at 25° C.); and epoxy equivalent weight, 190. The pot life for this composition was ½ hour. The peak exotherm of the composition was 225° C.

*Example 2*

A composition was prepared by admixing 67.6 parts by weight of 1,2-bis(2,3-epoxy-2-methyl propoxy)ethane with 32.4 parts by weight of N-hydroxyethyl diethylene triamine.

Bar castings of the composition were prepared according to the procedure described in Example 1. Test pieces were then machined from the castings and tested according to the procedures noted below.

| Mechanical Properties | Test Method ASTM | |
|---|---|---|
| Heat distortion (° C.) | D-648 | 42.5 |
| Rockwell hardness (M scale) | D-785 | 53 |
| Izod impact strength (ft. lbs./inch notch) | D-256 | 0.21 |
| Flexural properties at room temperature | D-790 | |
| Maximum stress (p.s.i.) | | 10,700 |
| Stress at tangential proportional limit (p.s.i.) | | 5,000 |
| Modulus of elasticity (p.s.i.) | | 359,000 |

Example 3

Compositions of 1,2,3-tris(2,3-epoxypropoxy)propane, a polyglycidyl ether of glycerine, and various hydroxyalkyl alkylene polyamines were prepared by admixing the epoxy compound and a stoichiometric amount of the polyamine at room temperature. The properties of these compositions were comparable to the compositions of Example 2. The amines used are noted below:

N-hydroxypropyl diethylene triamine
N-hydroxypropyl propylene diamine
N-hydroxyoctyl diethylene triamine

What is claimed is:

1. A hardenable composition, stable for at least two days at a temperature of about 0° C., consisting essentially of 1,2,3-tris(2,3-epoxypropoxy)propane and a hydroxalkyl alkylene polyamine having at least one hydroxyalkyl group and at least three amino-hydrogen atoms per molecule, said polyamine being present in an amount sufficient to harden the said composition, said composition being maintained at a temperature of about 0° C.

2. The cured product of the composition of claim 1.

References Cited by the Examiner

UNITED STATES PATENTS

| | | | |
|---|---|---|---|
| 2,633,458 | 3/1953 | Shokal | 260—2 |
| 2,642,412 | 6/1953 | Newey et al. | 260—47 |
| 2,864,775 | 12/1958 | Newey | 260—2 |
| 2,901,461 | 8/1959 | Auerbach et al. | 260—2 |

WILLIAM H. SHORT, *Primary Examiner.*

S. N. RICE, T. D. KERWIN, *Assistant Examiners.*